United States Patent
Quick et al.

(10) Patent No.: US 7,489,818 B2
(45) Date of Patent: Feb. 10, 2009

(54) METHOD AND APPARATUS FOR PRESERVING BINARY DATA

(75) Inventors: Kenneth Neil Quick, Wichita, KS (US); Haskell Ross Turner, III, Jackson, MS (US)

(73) Assignee: Affiliated Computer Services, Inc., Dallas, TX (US)

( * ) Notice: Subject to any disclaimer, the term of this patent is extended or adjusted under 35 U.S.C. 154(b) by 565 days.

(21) Appl. No.: 10/925,667

(22) Filed: Aug. 25, 2004

(65) Prior Publication Data

US 2006/0045387 A1    Mar. 2, 2006

(51) Int. Cl.
  *G06K 9/54* (2006.01)
  *G06K 9/36* (2006.01)
  *H03M 13/00* (2006.01)

(52) U.S. Cl. .................. 382/182; 382/232; 382/305; 341/94

(58) Field of Classification Search .......... 382/305, 382/182; 341/94
See application file for complete search history.

(56) References Cited

U.S. PATENT DOCUMENTS

| 4,174,891 | A | | 11/1979 | Flint et al. |
|---|---|---|---|---|
| 4,346,449 | A | * | 8/1982 | Ovshinsky et al. .......... 219/216 |
| 4,513,390 | A | | 4/1985 | Walter et al. |
| 5,796,090 | A | * | 8/1998 | Pavlidis et al. ......... 235/462.05 |
| 5,825,402 | A | * | 10/1998 | Swartz ...................... 347/251 |
| 6,442,296 | B1 | | 8/2002 | Smith et al. |
| 2003/0090531 | A1 | | 5/2003 | Wong et al. |
| 2003/0233371 | A1 | * | 12/2003 | Abhyankar et al. ...... 707/104.1 |
| 2004/0050919 | A1 | * | 3/2004 | Calonje et al. .............. 229/306 |
| 2004/0075869 | A1 | | 4/2004 | Hilton et al. |
| 2004/0086163 | A1 | * | 5/2004 | Moriyama et al. .......... 382/131 |

* cited by examiner

*Primary Examiner*—Samir A Ahmed
*Assistant Examiner*—Stephen R Koziol
(74) *Attorney, Agent, or Firm*—Alston & Bird LLP (57) ABSTRACT

A method and apparatus are provided for preserving binary data on an analog archival medium, such as microfilm, in which the binary data is encoded, such as in a barcode symbol, in accordance with a predefined encoding specification. The predefined encoding specification may be stored along with the binary data to facilitate subsequent recovery of the binary data, even if the encoding technique has become obsolete. Error detection and correction code may be generated for the binary data and stored along therewith. By comparing the error correction code associated with the original binary data with an error correction code generated based upon the recovered data, the accuracy of the recovered data may be confirmed. Corresponding methods and apparatus for recovering the binary data are also provided.

65 Claims, 3 Drawing Sheets

METHOD AND APPARATUS FOR PRESERVING BINARY DATA

FIELD OF THE INVENTION

The present invention relates generally to a method and apparatus for preserving binary data and, more particularly, to a method and apparatus for preserving binary data utilizing an analog archival medium, such as microfilm or acid-free paper.

BACKGROUND OF THE INVENTION

It is oftentimes desirable to archive various types of data such that the data may be retrieved years later, such as hundreds of years. From the professional perspective, it may be desirable, for example, to archive governmental, corporate or financial records. Similarly, from the personal perspective, it may be desirable to archive audio and/or video recordings or the like.

Historically, microfilm has been employed as an archival medium. Microfilm is advantageous because microfilm can exist for hundreds of years, such as in excess of five hundred years, with minimum maintenance. Microfilm is designed to record images, such as images of documents. By way of example, images of a newspaper or other publications are often stored on microfilm. These analog images have typically been recorded on microfilm using a photographic "flash" exposure process from the original paper document. Relatively recently, recording systems have been developed that expose microfilm using a light emitting diode (LED) "printing process" that removes any need to print an image to paper and, instead, allows an image to be recorded directly on microfilm. For example, Eastman Kodak Company has developed a document archive writer, such as the Model 4800 Document Archive Writer, for recording images directly on microfilm. These writers are generally referred to as Computer-Output-Microfilm (COM) recording systems.

In order to retrieve the data recorded on microfilm, a print of the image stored by the microfilm is obtained. As a result of the characteristics of the microfilm, as well as the techniques for recording data to and reading data from microfilm, the result may be a grainy, high contrast photographic print of the image that is stored by the microfilm. While acceptable for many types of analog data, such as images of a newspaper or other publications, the resulting, relatively low resolution images are generally unacceptable for binary data. In this regard, binary data, also known as digital data, computer data, computer files or the like, consists of a series of ones and zeros. This sequence of ones and zeros must be faithfully maintained in the recording and retrieval process or else the entire file of binary data may become meaningless and garbled beyond recognition. Since the archival requirements for binary data require the reproduction of an exact duplicate of the original binary data, microfilm has therefore not been thought to be an acceptable archival medium for binary data.

As a result, binary data has typically been stored on other types of media that have been predicted to have a relatively long life time. For example, binary data is commonly stored on optical disks, including compact disks, that are intended to last for decades. The ability to store binary data on optical disks for decades is sufficiently long for most data, but may not be acceptable for archival purposes, for some data is desirably stored for hundreds, not tens, of years. Compounding this problem, some optical media has been found to not last as long as originally advertised by the manufacturer such that the optical media may not even reliably store the binary data for decades as advertised.

Even if optical disks or other digital media were capable of faithfully storing the binary data for decades or longer, problems may arise because the equipment required to retrieve the binary data becomes obsolete and unsupported long before the lifespan of the optical media expires. Thus, even though the optical media may be capable of storing binary data for decades, it is questionable if the equipment required to read the binary data from the optical media will similarly exist and be supported decades from now.

As a result, binary data may be stored to a first medium, such as an optical disk, from some period of time and thereafter migrated from the first medium to another medium as newer media is developed. By migrating the binary data from an older medium to a newer medium, problems associated with the potential obsolescence of the equipment required to retrieve the binary data and the problems associated with the lifespan of the medium itself are generally overcome. However, the migration of the binary data creates additional problems of its own including the expense, both in terms of hardware and personnel required to conduct the migration. In addition, with each migration of the binary data from one medium to another, errors may occur in the retrieval and subsequent rewriting of the binary data with even small errors potentially rendering the binary data meaningless as noted above.

As such, an improved technique for preserving binary data would therefore be advantageous. In this regard, improvements in the preservation of binary data become even more important with increases in the quantity, importance and archival life of the binary data. In particular, it would be advantageous to develop an improved technique for accurately preserving binary data for hundreds of years without having to migrate the binary data from one archival medium to another and without concern regarding the obsolescence of the equipment required to retrieve and interpret the binary data from the archival medium.

BRIEF SUMMARY OF THE INVENTION

Improved methods and apparatus are therefore provided for preserving binary data. In this regard, embodiments of the methods and apparatus preserve the binary data in such a way that there is less, if any, need to migrate the binary data from one archival medium to another, thereby reducing or eliminating the expenses associated with the migration and the associated possibility of errors. Embodiments of the methods and apparatus of the present invention also permit the accurate reproduction of the binary data from an analog archival medium, thereby preserving the integrity of the binary data. Further, embodiments of the methods and apparatus of the present invention preserve the binary data in a manner that permits the binary data to be retrieved in decades or centuries without concern for the obsolescence of the equipment or techniques associated with the retrieval and interpretation of the binary data. As such, the methods and apparatus of the present invention address many of the shortcomings of the conventional archival techniques and offer a number of other advantages.

According to one aspect of the present invention, a method and apparatus are provided for preserving binary data on an analog archival medium in which the binary data is encoded, such as by means of a processor, in accordance with a predefined encoding specification. For example, the binary data may be encoded as a bar code symbol. The encoded binary data is then written to the analog archival medium, such as by means of a writer. To facilitate subsequent recovery of the binary data, information relating to the predefined encoding specification is also written to the analog archival medium, again such as by the writer. In this regard, unencoded information, such as text and drawings, relating to and, more generally, defining the predefined encoding specification may be written to the analog archival medium.

A corresponding method and apparatus for recovering binary data stored on an analog archival medium along with information relating to the predefined encoding specification are also provided according to other aspects of the present invention. In this regard, the encoded data as well as the information relating to and, more generally, defining the predefined encoding specification are read from the analog archival medium, such as by means of a reader, e.g., a scanner. The encoded data is then decoded, such as by means of a processor, in accordance with the predefined encoding specification to recover the binary data. As such, the retrieval and interpretation of the encoded binary data can more assuredly be conducted years from now without concern for the obsolescence of the particular encoding technique since the specification that defines the encoding technique may be stored along with the binary data by the analog archival medium. As such, even if the particular technique for encoding the binary data was obsolete at the time of reading the binary data from the analog archival medium, the encoding specification could be accessed, and the binary data could be decoded based upon the encoding specification. As noted above, the predefined encoding specification may be stored in an unencoded form, such as in a textual form, to facilitate access to the predefined encoding specification without need for any further information.

According to another aspect of the present invention, a method and apparatus for preserving binary data on an analog archival medium, such as microfilm or acid-free paper, are provided in which the accuracy with which the binary data is reproduced is assured. In this regard, an error detection code associated with the binary data is determined, such as by a processor. For example, the error detection code may be determined by performing a cyclic redundancy check. The binary data is then encoded, such as by the processor. For example, the binary data may be encoded as a barcode symbol. The encoded binary data and a representation of the error detection code are then written onto the analog archival medium, such as by means of a writer. The method and apparatus of this aspect of the present invention may determine error detection codes based on various portions of the data. In one embodiment, for example, the binary data is representative of a file comprised of a plurality of blocks of data that are separately encoded. As such, the error detection code may be determined collectively for the entire file and/or separately for each block.

The error detection codes assist in the subsequent reproduction of the binary data. In this regard, a corresponding method and apparatus are provided for recovering binary data stored on an analog archival medium along with an associated error detection code. In this regard, the encoded data as well as the representation of the error detection code are read from the analog archival medium, such as by means of a reader. The encoded data is then decoded to recover the binary data and the accuracy of the recovered binary data may be determined based upon the error detection code. For example, a processor may decode the encoded data and subsequently determine its accuracy based upon the error detection code, such as by comparing the error detection code determined for the decoded binary data with the error detection code that was originally determined for the binary data. In addition to an error detection code, an error correction code may be utilized to correct the binary data that has been retrieved in order to faithfully reproduce the binary data that was originally encoded and written to the analog archival medium. As such, the method and apparatus of this aspect of the present invention may improve the reliability and credibility associated with the archiving of binary data.

According to another aspect of the present invention, a method and apparatus are provided for preserving binary data as a barcode symbol that is written to an analog archival medium, such as microfilm or acid free paper. In this regard, the binary data is representative of a file and may be encoded as a multi-dimensional barcode, typically by means of a processor. In one embodiment, the barcode is a two-dimensional barcode. Advantageously, the binary data may be encoded as a barcode that is capable of uniquely representing at least 256 different characters, that is, each of the 256 different characters that may be defined by an 8-bit byte of data. The barcode representing the encoded binary data is then written, such as by means of a writer, onto the analog archival medium. In this regard, an image of the barcode symbol may be created on the analog archival medium.

Similarly, a method and apparatus of recovering binary data representative of a file from an analog archival medium are provided in which a barcode symbol is read from the analog archival medium, such as by means of a reader, and is thereafter decoded to recover the binary data, such as by means of a processor. The file that is represented by the binary data may thereafter be reconstructed based at least partially upon the recovered binary data. Typically, the reconstruction of the file is also performed by the processor.

By encoding the binary data that is representative of the file as a barcode symbol, such as a two-dimensional barcode, a substantial quantity of data can be encoded and written to the analog archival medium in an efficient and reproducible manner. Moreover, the prevalence of barcode technology increases the likelihood that standardized equipment will be available to read and decode the barcode symbols.

A method of preserving a plurality of files that are each comprised of binary data is also provided which maintains the relationship between the various files. In this regard, the binary data that comprises each file is encoded, such as by being encoded as a barcode symbol. The encoded binary data for a respective file is then written to the analog archival medium, such as microfilm or acid free paper, along with information that at least partially defines a relationship between the respective file and at least one other file. In this regard, the information defining the relationship of a respective file to at least one other file may include information that defines directory location relationships between at least some of the plurality of files. As such, not only may an individual file be reconstructed based upon the encoded binary data, but the relationship of that file to other files may be re-established to permit the files to be properly executed since the proper execution of the files may depend upon the maintenance of the proper relationship between the files.

By maintaining this additional information, such as information regarding the directory location relationships between the files, the method and apparatus of this aspect of the present invention are able to maintain a distinction between multiple files with identical names. In this regard, multiple identically named files that are differentiated by directory structure are restorable without risk of newer restorations overwriting older restorations.

Methods and apparatus are therefore provided according to the various aspects of the present invention that address many of the shortcomings of prior techniques for archiving binary data and provide numerous other advantages. In this regard, various aspects of the methods and apparatus of the present invention permit binary data to be encoded and recorded in such a manner that concern regarding potential obsolescence of the encoding technique is eliminated. Additionally, aspects of the method and apparatus of the present invention permit the binary data to be written to an analog archival medium in an encoded fashion and to be thereafter read from the analog archival medium in such a manner that the original binary data can be accurately reproduced while permitting the accuracy to be confirmed. Further, aspects of the method and apparatus of the present invention permit the relationship between multiple files, such as the various listings within a computer directory, to be maintained even if the binary data representative of the files is separately encoded and written to an analog archival medium.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

According to the present invention, methods and apparatus for preserving binary data on an analog archival medium and thereafter recovering binary data from the analog archival medium are provided. As used herein, an analog archival medium is a medium for storing an analog representation of data expressed in various forms for a substantial period of time. For example, an analog archival medium may be capable of storing data for hundreds of years, such as for 500 years, and is therefore an attractive data repository for archivists. A common example of an analog archival medium is microfilm, although acid-free paper or photo-etched or laser engraved media may also be utilized since such other nearly entropically equalized media may also preserve data recorded thereupon for hundreds of years. With respect to microfilm, the microfilm can be provided in various forms, although the microfilm is typically provided on a reel, as known to those skilled in the art.

The binary data that is preserved in an encoded form by the analog archival medium generally exists in its most basic form as a sequence of ones and zeros. The sequence of ones and zeros may be representative of various types of data, including a computer file, the output or data produced by the execution of a computer application, a stream of digital data, a video clip, an audio sound recording, and many other different types of data, including the application itself. As described herein, the binary data is encoded and is thereafter written to the analog archival medium such that an image of the encoded binary data is created on and carried by the analog archival medium. The image that is created on the analog archival medium is generally perceptible to a human, at least after magnification and illumination, although a decoding process generally must be employed in order to recover the original binary data. By thereafter analyzing the image of the encoded binary data, the binary data itself can be recovered. Although a laborious process, a human being of moderate mathematical skill can decode the encoded binary data directly from the archival medium's images such that the binary data is faithfully restored. As described below, a processor 12 may be utilized to speed the decoding process and eliminates errors.

Figure 1:
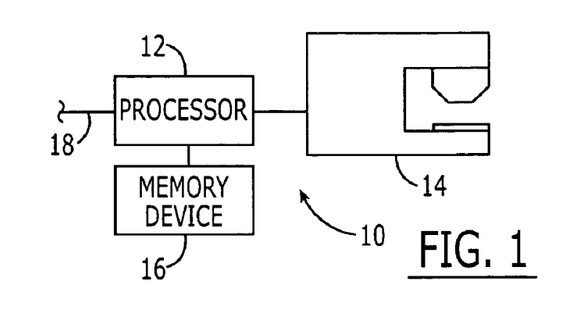
FIG. 1 is a block diagram of an apparatus according to one embodiment of the present invention.

As shown by FIG. 1, an apparatus 10 of one embodiment of the present invention generally includes a processor 12 in communication with a writer and/or reader 14. As will be apparent, an apparatus dedicated to storing binary data need only include a processor communicably connected to a writer, while an apparatus dedicated to reading binary data from an analog archival medium need only include a processor in communication with a reader. However, many embodiments of the apparatus are designed to both write and read the binary data and therefore include a processor in communication with both a writer and a reader.

The processor 12 may be comprised of one or more microprocessors or other computing devices. However, in one embodiment, the processor is comprised of a computer, such as personal computer, capable of operating under control of one or more computer software programs or applications stored by a memory device 16 that is accessible by the computer. The computer may therefore be controlled by the programs or applications to operate in such a manner as to perform the various functions described hereinbelow. Additionally, the apparatus 10 of the present invention may include various types of writers and/or readers 14. In instances in which the analog archival medium is microfilm, the writer and/or reader may comprise any conventional microfilm writer or reader and, in one embodiment, is a computer-output-microfilm (COM) recording system, such as the Document Archive Writer, Model 4800, manufactured by Eastman Kodak Company of Rochester, N.Y.

Figure 2:
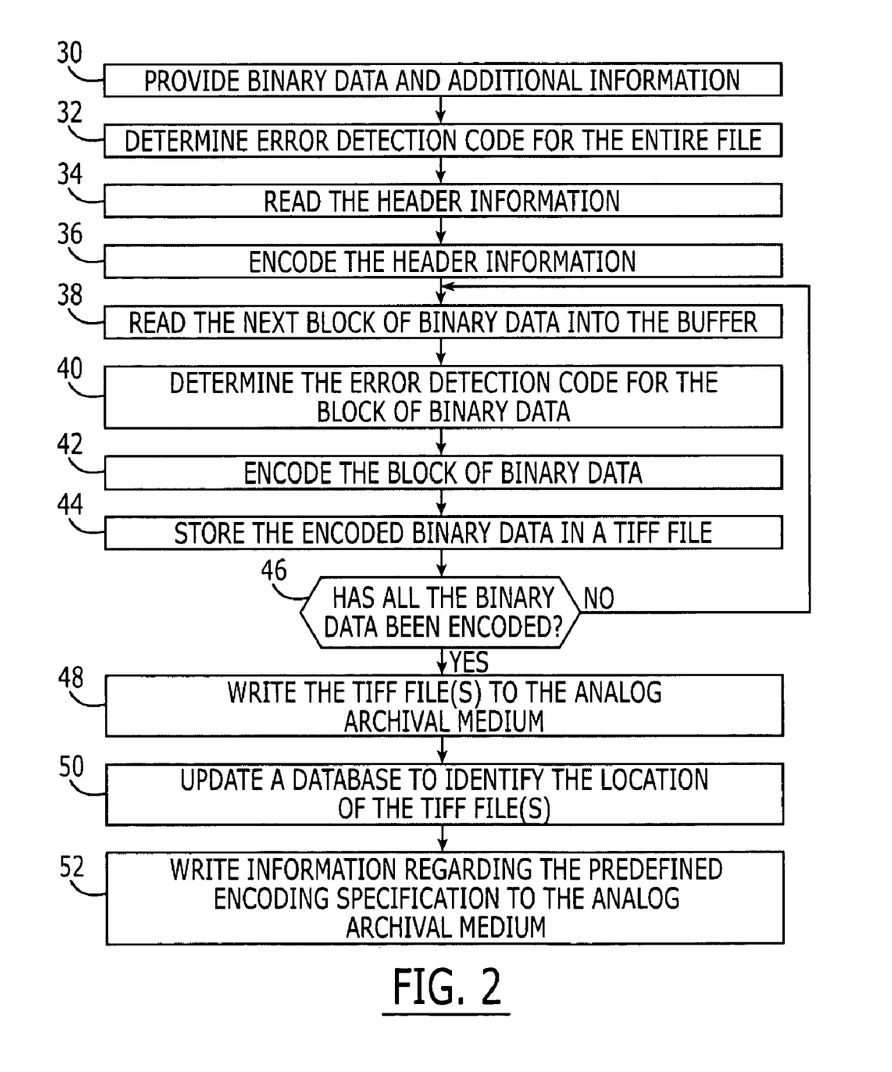
FIG. 2 is a flowchart illustrating the operations performed to preserve binary data according to one embodiment of the present invention.

In order to preserve binary data, the binary data is initially provided to the processor as noted in step 30 of FIG. 2. As noted above, various types of binary data may be preserved and, as a result, the binary data may therefore be obtained from a variety of different sources including, for example, memory devices 16 associated with the processor or memory devices or other data sources coupled to the processor via a network or other type of communication link 18. Regardless of the manner in which the binary data is provided, additional information, such as information relating to the original location of the binary data and characteristics associated with the binary data, may also be provided to the processor. In instances in which the binary data represents a computer file, this additional information may include information identifying the location of the file within the directory structure of a computer including information defining the relationship of the respective file to one or more other files in the directory structure. The additional information may also include characteristics of the computer file, such as an indication as to whether the computer file is read-only, is considered a system file or the like.

In order to reliably recover the binary data, an error detection code, such as a cyclic redundancy code (CRC), and/or an error correction code, such as a Reed-Solomon error correction code, may be determined. While error detection codes and/or error correction codes may be separately determined for different portions or blocks of the file as described below, the method and apparatus of one embodiment of the present invention determine both an error correction code and an error detection code for each block, such as by determining a Reed-Solomon error correction code and performing a CRC for each block, and an error detection code for the entire file, as noted by step 32 of FIG. 2. The result of the CRC and/or the error correction code may then generally be stored on the analog archival medium, along with the file.

For files that include header information, the processor 12 may initially read the header information, as shown in step 34 of FIG. 2. As noted above, the header information that is read by the processor may include information identifying the location of the file within the directory structure of a computer including information defining the relationship of the respective file to one or more other files in the directory structure. The header information that is read by the processor may also include characteristics of the computer file, such as an indication as to whether the computer file is read-only, is considered a system file or the like. Thus, the processor can determine the name, path, properties, size and the like associated with the file.

The processor 12 may then encode header information, as well as any additional control and/or overhead information, in preparation for being written to microfilm or another analog archival medium. See step 36 of FIG. 2. While the information may be encoded in various manners, the information is advantageously encoded in accordance with a standard encoding technique that is well understood and documented in order to facilitate the subsequent decoding and recovery of the binary data. In one advantageous embodiment, the method and apparatus 10 of the present invention encode the binary data, such as the header and other information associated with a file, as a barcode symbol (also referenced herein merely as a barcode). In order to store a significant amount of binary data in an encoded form within a barcode, the method and apparatus of one embodiment encodes the binary data as a two-dimensional or other multi-dimensional barcode. Various standard or non-standard, proprietary or non-proprietary barcodes or symbols may be utilized, such as PDF-417 which is a stacked barcode technology that resembles a standard linear barcode in shape with start and stop vertical bars on each end. According to one advantageous embodiment, however, the method and apparatus of the present invention encode the binary data, including the header and other information, in a data matrix barcode. As known to those skilled in the art, a data matrix barcode includes a series of squares to encode reference lines, timing marks, source data and an error correction code (e.g, the Reed Solomon error correction code discussed above) in a compact square or rectangular symbol. A data matrix barcode can encode a variety of character sets, but the method and apparatus of one embodiment of the present invention advantageously makes use of the base 256 mode of the data matrix barcode that is capable of uniquely encoding 256 different characters, thereby permitting each unique pattern combination that may be formed by the 8 bits of a data byte to be uniquely represented. Further details regarding the data matrix barcode technology are provided by ISO/IEC 16022 International Standard *Information Technology—International Symbol/Specification—Data Matrix*.

As noted above, the header information may be encoded in a data matrix symbol. Additional information, such as information regarding the copyright rights in the data, the results of the CRC for the entire file as discussed above and the block size of the subsequent data blocks can also be encoded within the same data matrix symbol. Each barcode symbol may also include a sequence number to permit the various barcode symbols to be ordered. As such, the barcode symbol that includes the header and other information may include an encoded sequence number of 0 or some other predefined value. While the information that is encoded into the barcode symbol may be organized in various manners, the method and apparatus of one embodiment reserves the first few bytes, such as the first four bytes, for the sequence number with the header and other information following thereafter.

Once the barcode symbol that contains the encoded header and other information has been formed, the remainder of the file and, in particular, the binary data that comprises the remainder of the file is encoded, such as into one or more additional barcode symbols. In this regard, the processor 12 may read a first portion of the binary data that comprises the file into a buffer having a block size equal to that defined by the initial barcode symbol. See step 38. For the block of data, the error correction code and the error detection code, such as the CRC, may be determined, as noted in step 40 of FIG. 2. The sequence number for the respective block of data, the error detection code and the binary data stored in the buffer may then be concatenated and encoded into a barcode symbol along with the error correction code by the processor, as noted by step 42.

Figure 3:
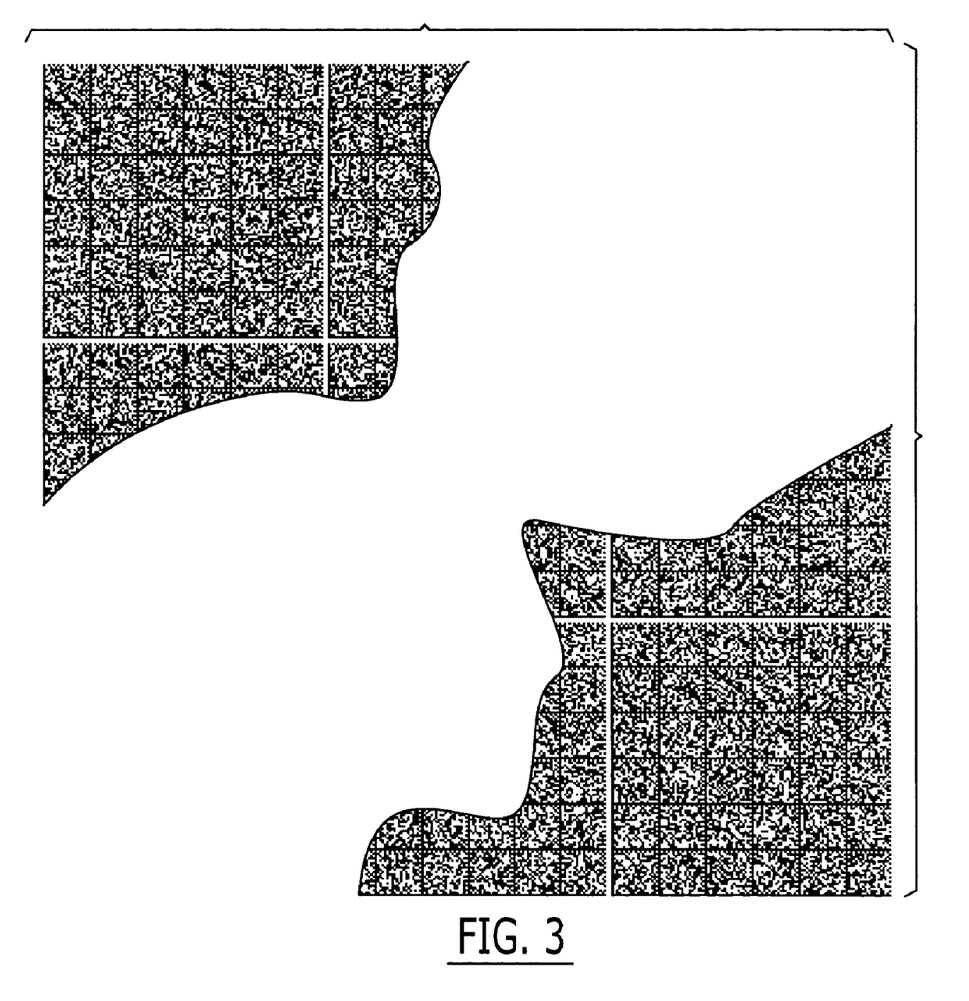
FIG. 3 is an exemplary tagged image file format (TIFF) file containing a plurality of data matrix barcodes representative of encoded blocks of binary data constructed as an intermediate step in accordance with one embodiment of the present invention.

In one embodiment, the processor 12 creates an image file, such as a tagged image file format (TIFF or .tif) file, and places each barcode symbol (including the barcode symbol that contains the header and other information) into the tagged image file following the encoding process described above. See step 44. In constructing the TIFF file, each barcode symbol must be spaced from adjacent barcode symbols by an appropriate quiet space to permit the subsequent imaging and reading of the barcode symbols to be conducted in an accurate manner. One example of a TIFF file including a plurality of data matrix barcode symbols is depicted in FIG. 3. The processor generally maintains the TIFF file in memory 16, at least up until the time at which the image of the TIFF file is written to the analog archival medium.

This process of separating the binary data into blocks (step 38), determining the respective error detection code (step 40), encoding the block of binary data, the error detection code, the error correction code and the respective sequence number for the block of binary data, such as into a barcode symbol (step 42), and then storing the resulting barcode symbol in a TIFF file (step 44) is then repeated until the entire file has been encoded into a plurality of barcode symbols, as noted by step 46. With respect to the last block of data, any unused space within the buffer is generally padded. Additionally, the sequence number associated with the last block of data may be defined in such a manner as to readily identify the last block. Although the sequence number of the last block may be defined in various manners, the sequence number may be defined as a negative number, such as by performing a two's complement negation of the sequence number that otherwise would be assigned to the last block of data. Since the last block of data will be the only block of data having a negative sequence number, the last block of data may be readily identified thereby.

In constructing the TIFF file, it is noted that the resulting image of the TIFF file may have a predefined width and length, such as 3888 pixels×3888 pixels. As such, once a respective TIFF file reaches its maximum size, the processor 12 may create another TIFF file to store the subsequent barcode symbols. As such, the encoding process may result in the creation of a plurality of TIFF files storing barcode symbols representative of different blocks of binary data.

Also of note is the size of the elements of the barcode symbols. As such, the elements can range in size from a single pixel to an element made up of many hundreds or thousands of pixels, the determination of which is a matter of film grain counts, film quality and writer specifications.

Once the binary data has been encoded, the encoded binary data, such as the barcode symbols representative of the binary data, is then written to the analog archival medium, such as microfilm, by means of the writer 14. See step 48 of FIG. 2. In the above-described embodiment, for example, the encoded binary data is written to the analog archival medium by writing images of the TIFF files to the analog archival medium since each TIFF file includes barcode symbols representative of respective blocks of binary data. Once the writer has written the encoded binary data to the analog archival medium, the processor 12 may update a database that identifies the location of the encoded binary data upon the analog archival medium, such as by reel and frame number in instances in which the encoded binary data is stored on microfilm. See step 50. This database may be maintained in memory 16 or may be printed on paper or preserved on microfilm or another analog archival medium, if so desired. By appropriately processing and handling the analog archival medium, the analog archival medium and the encoded data stored thereon may last for hundreds of years. For example, by processing and handling microfilm in accordance with the ANSI/AIIM MS-23-1998 and MS-45-1990 LE500 procedures, the microfilm and the encoded data written thereto may last for five hundred years.

Although not necessarily written on each roll of microfilm, the method and apparatus 10 of one advantageous embodiment of the present invention also writes information relating to the predefined encoding specification according to which the binary data was encoded onto the analog archival medium. See step 52 of FIG. 2. For binary data encoded as a data matrix barcode, for example, the specification that defines the data matrix barcode and the corresponding encoding/decoding process may be written to the analog archival medium. Additionally or alternatively, the information relating to the predefined encoding specification may be comprised of a series of computer instructions, such as the commented source code that is operative to decode the encoded binary data, and may similarly be written onto the analog archival medium. Advantageously, the information relating to the predefined encoding specification is written in an unencoded format, such as by providing the text of the appropriate encoding specification and/or the commented source code. As such, the information relating to the predefined encoding specification may be retrieved from the analog archival medium in the future without requiring the use of any unique or proprietary reader. With respect to information relating to the predefined encoding specification that is written onto microfilm, the information relating to the predefined encoding specification may be read therefrom by illuminating the microfilm with an appropriate light source and focusing the resulting image with a lens upon an appropriate surface. Based upon the information relating to the predefined encoding specification, a person can determine how to read and decode the encoded binary data, even if the encoding technique by which the binary data was encoded has become obsolete since the date on which the encoded binary data was written to the analog archival medium.

While one advantageous embodiment for encoding binary data and writing the encoded binary data to an analog archival medium is described above, the method and apparatus of the present invention also contemplate a number of alternative embodiments. For example, the encoded binary data need not be temporarily stored in TIFF files. Instead, the encoded binary data may be stored in other types of files pending subsequent writing to the analog archival medium. Alternatively, the encoded binary data may be written directly to the analog archival medium following the encoding process without be temporarily stored in a TIFF file or any other type of file.

Figure 4:
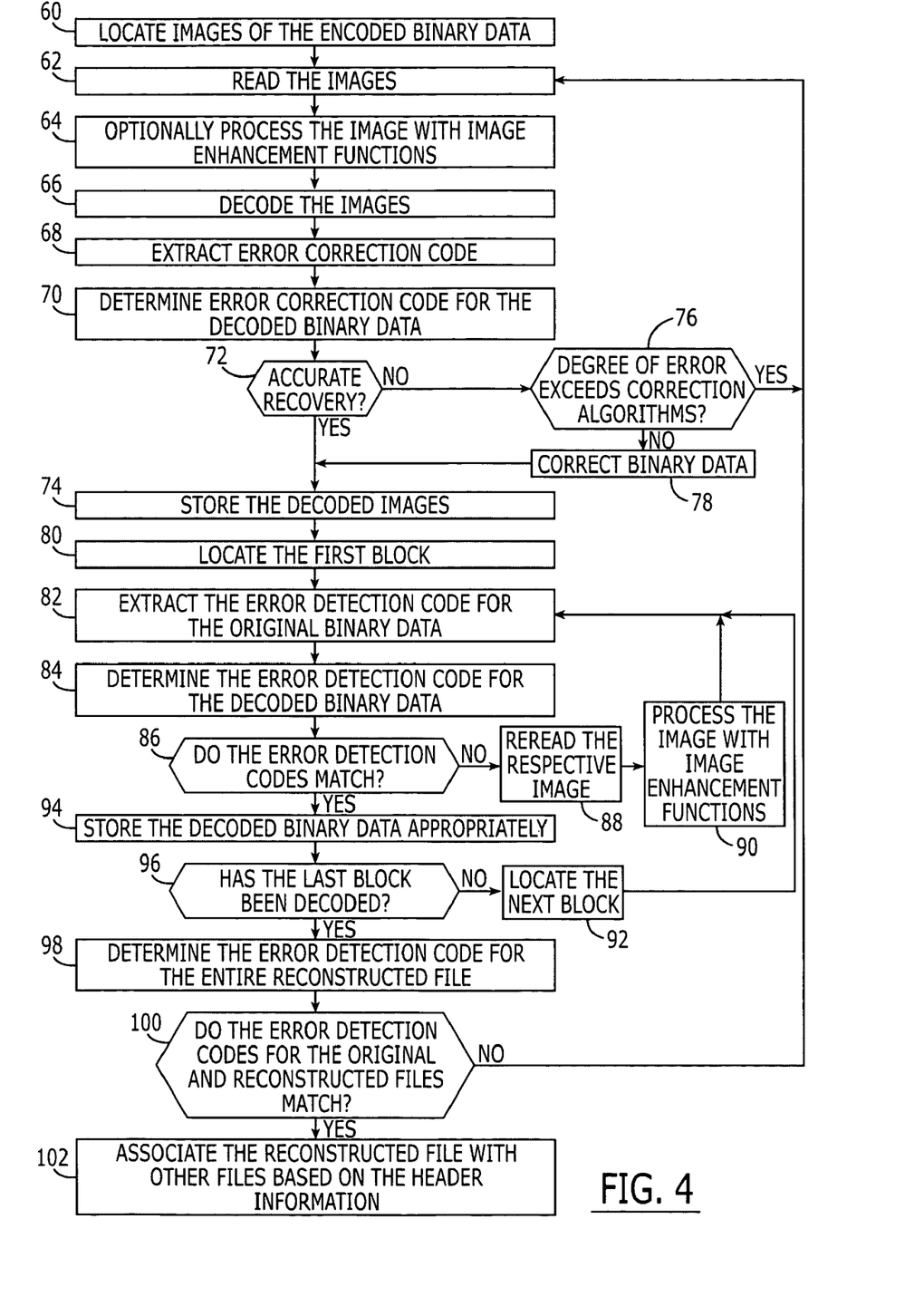
FIG. 4 is a flowchart illustrating the operations performed to recover binary data according to one embodiment of the present invention.

Referring now to FIG. 4, the method and apparatus 10 of other embodiments of the present invention facilitate retrieval of encoded binary data from an analog archival medium, such as microfilm. Initially, the images of the encoded binary data that are stored on the analog archival medium are located as indicated by step 60. These images may be located in various manners, such as by querying a database maintained by the processor that identifies the location of the images of the encoded binary data that represents a respective file. As noted above, this database may be maintained in memory 16 or may be printed on paper or preserved on microfilm or another analog archival medium, if so desired.

Once the appropriate images have been located on the analog archival medium, the images are read or extracted by the reader 14, as shown in step 62. In the embodiment in which microfilm serves as the analog archival medium, the images may either be directly scanned to create an electronic image, or the images may be printed to paper and thereafter scanned to create an electronic image, as known to those skilled in the art. The resulting images may thereafter optionally be processed, such as by the processor 12, in accordance with any of a number of conventional image enhancement functions, such as image rotation, image de-skew, image despeckle, image sharpening, image smoothing, etc. See step 64. Following the performance of any desired image enhancement function, the reader and/or the processor decodes the images as shown in step 66. This decoding is performed in accordance with the same predefined encoding specification with which the binary data was originally encoded. While the reader and/or processor may already be programmed to perform the necessary decoding, the information regarding the defined encoding specification may be read from the analog archival medium itself and then utilized to develop the necessary decoding technique, thereby rendering moot any concern that the encoding technique may become obsolete prior to reading the encoding binary data. In this regard, the decoding technique as detailed by ISO/IEC 16022 is architecture independent, so even if 2004-era Von Neumann architecture computers are replaced by a future architecture, the binary data contained on the analog archival medium will still be decodable.

In the decoding process, the processor 12 may then extract the error correction code for each block of the binary data. See step 68. The decoded binary data may then be further processed by the processor to determine the error correction code, such as the Reed-Solomon code, for the decoded binary data. See step 70. By calculating the error correction code for the decoded binary data and comparing the results with the embedded error correction code associated with the original binary data, the processor can determine if the binary data has been accurately recovered. See step 72. If so, the recovery process can continue and the decoded binary data may be stored as shown in step 74. If not, and the degree of error does not exceed the limitations imposed by the correction algorithms, the binary data can be corrected and no further error correction processing may be required. See steps 76 and 78. If the error percentage is beyond the repair capabilities of the correction algorithms, the images may be reread from the analog archival medium and then processed according by one or more of the conventional image enhancement functions prior to being again decoded, as described above. This process can be repeated until the error correction codes associated with the original binary data and the decoded binary data match.

In order to properly order the images, the processor 12 next accesses the sequence number included within each symbol, such as by accessing the field, such as the first four bytes, that stores the sequence number. Based upon the sequence numbers, the processor locates the first image as indicated by step 80 of FIG. 4. As described above, the first images generally include encoded header and other information. Thus, the first images may be processed so as to extract the file name, file path, file attributes and the error detection code, such as the CRC, associated with the entire file. This information is generally stored in the memory device 16 associated with the processor as text. The file size and the block size are also generally extracted from these first images and saved. The processor may also create a new file utilizing the file path and file name obtained from these first images that will subsequently be populated with the binary data.

The processor 12 may also extract the error detection code, such as the CRC, for the respective data block, i.e., the first data block. See step 82. The decoded binary data may then be further processed by the processor to determine the error detection code, such as the CRC, for the decoded binary data. See step 84. By comparing the error detection code determined for the decoded binary data with the error detection code associated with the original binary data, the processor can determine if the binary data has been accurately recovered. See step 86. If so, the recovery process can continue. If not, further processing may be required. In this regard, the image that represents the first data block may be reread from the analog archival medium and then processed according to one or more of the conventional image enhancement functions prior to being again decoded, as described above. See steps 88 and 90. This process can be repeated until the error correction codes associated with the original binary data and the decoded binary data match.

Once the block(s) of data that include(s) the header and other information has been processed, the first block of binary data is processed. In this regard, the block of binary data is located by means of the sequence number associated with the block of data, as indicated by steps 96 and 92. The processor then extracts the error detection code, such as the CRC, for the respective block of data. See step 82. The error detection code that is extracted in step 82 is then compared to the error detection code, such as the CRC, that is determined by the processor 12 for the decoded data in step 84 to determine if the binary data has been accurately recovered from the analog archival medium. If the error detection codes match, the binary data has been properly recovered. Otherwise, the corresponding image is re-read and processed according to additional image enhancement functions, as described above in steps 88 and 90, until the resulting error detection codes do match.

Once the method and apparatus 10 determine that the decoded binary data is accurate, the binary data is stored by being appended to the file that has been created by the processor 12. See step 94. The process of analyzing the next block of data, as defined by the sequence numbers, is repeated until all of the blocks of data have been analyzed, assured to be accurate, and appended to the file. The last block of data may be identified by the processor in various manners including by means of a negative sequence number, as noted above. This block of data may include a number defining the size of the block such that the processor can extract the binary data included within this last block, confirm its accuracy and append the binary data to the file created by the processor.

Once the last block of data has been processed as noted by step 96 and the entire file has been recovered, the processor 12 may determine the error detection code, such as the CRC, for the entire reconstructed file. See step 98 of FIG. 4. This error detection code may then be compared to the error detection code determined for the original file and extracted from the first block of data. See step 100. If the error correction codes match, the processor can determine that the file has been accurately recovered. If, however, the error detection codes do not match, the process of recovering the binary data from the analog archival medium can be repeated with the addition of image enhancement and manipulation routines.

If the file is determined to be an accurate representation of the original file, the date and other attributes associated with the reconstructed file, i.e., the new file created by the processor 12, can be set to have the same values as the original file and as defined by the first block of data that includes header and other information. Based upon the information included in the first block of data regarding the relationship of the respective file to at least one other file, such as information defining the original directory listing for the file and optionally other files included in the same directory, the processor is capable of not only reconstructing the original file, but also of properly associating the reconstructed file with other files. See step 102 of FIG. 2. Thus, even if execution of the reconstructed file requires access to or concurrent execution of other related files, the maintenance of the information defining the relationship of the reconstructed file with other files permits the reconstructed file to be properly associated with other files and therefore properly executed.

By utilizing an analog archival medium, such as microfilm or acid free paper, binary data may be stored for hundreds of years without having to migrate the binary data from one medium to another. Additionally, the method and apparatus 10 of the present invention overcome issues relating to the obsolescence of the encoding technique and the read/write technology by storing information associated with the predefined encoding specification along with an encoded representation of binary data such that the binary data may be decoded by reference to the information regarding the predefined encoding specification. Moreover, the utilization of error detection and correction codes permits confirmation that the binary data has been accurately reproduced and, in the event that the binary data is not initially reproduced in an accurate fashion, permits supplementation or modification of the encoded binary data such that an accurate decoding of the binary data may eventually be recovered.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of preserving binary data comprising:
providing an analog archival medium;
encoding the binary data in accordance with a predefined encoding specification;
writing the encoded binary data onto the analog archival medium; and
writing information relating to the predefined encoding specification onto the analog archival medium to facilitate subsequent recovery of the binary data,
wherein writing information relating to the predefined encoding specification onto the analog archival medium comprises writing unencoded information relating to the predefined encoding specification onto the analog archival medium.

2. A method according to claim 1 wherein writing information relating to the predefined encoding specification onto the analog archival medium comprises writing text in any language relating to the predefined encoding specification onto the analog archival medium.

3. A method according to claim 1 wherein encoding the binary data comprises machine-readable symbolic encoding the binary data as a barcode symbol, and wherein writing encoded binary data onto the analog archival medium comprises writing the barcode symbol representing the encoded binary data onto the analog archival medium.

4. A method according to claim 1 wherein providing an analog archival medium comprises providing an analog archival medium selected from the group consisting of microfilm and acid free paper for preserving the binary data.

5. A method according to claim 1 wherein writing the encoded binary data comprises writing a plurality of blocks containing the encoded binary data onto the analog archival medium and linking the plurality of blocks in sequence.

6. A method of preserving binary data comprising:
providing an analog archival medium;
determining an error detection code associated with the binary data;
encoding the binary data in accordance with a predefined encoding specification;
writing the encoded binary data and a representation of the error detection code onto the analog archival medium; and
writing information relating to the predefined encoding specification onto the analog archival medium to facilitate subsequent recovery of the binary data,
wherein writing information relating to the predefined encoding specification onto the analog archival medium comprises writing unencoded information relating to the predefined encoding specification onto the analog archival medium.

7. A method according to claim 6 wherein the binary data is representative of a file comprised of a plurality of blocks of data that are separately encoded, and wherein determining the error detection code comprises determining the error detection code for the entire file.

8. A method according to claim 6 wherein the binary data is representative of a file comprised of a plurality of blocks of data that are separately encoded, and wherein determining the error detection code comprises separately determining the error detection code for each block.

9. A method according to claim 6 wherein determining the error detection code comprises performing a cyclic redundancy check.

10. A method according to claim 6 wherein encoding the binary data comprises machine-readable symbolic encoding the binary data as a barcode symbol, and wherein writing encoded binary data onto the analog archival medium comprises writing the barcode symbol representing the encoded binary data onto the analog archival medium.

11. A method according to claim 6 wherein providing an analog archival medium comprises providing an analog archival medium selected from the group consisting of microfilm and acid free paper for preserving the binary data.

12. A method according to claim 6 wherein writing the encoded binary data comprises writing a plurality of blocks containing the encoded binary data onto the analog archival medium and linking the plurality of blocks in sequence.

13. A method of preserving binary data representative of a file, the method comprising:
providing an analog archival medium selected from the group consisting of microfilm, acid-free paper, photo-etched media and laser engraved media;
encoding the binary data that is representative of a file as a barcode symbol in accordance with a predefined encoding specification;
writing the barcode symbol representing the encoded binary data onto the analog archival medium; and
writing information relating to the predefined encoding specification onto the analog archival medium, wherein the information relating to the predefined encoding specification comprises unencoded information relating to the predefined encoding specification.

14. A method according to claim 13 wherein encoding the binary data as a barcode symbol comprises encoding the binary data as a multi-dimensional barcode symbol.

15. A method according to claim 13 wherein encoding the binary data comprises encoding the binary data so as to uniquely represent at least the 256 different characters associated with a single byte.

16. A method according to claim 13 wherein writing the barcode symbol comprises creating an image of the barcode symbol on the analog archival medium.

17. A method according to claim 13 wherein encoding the binary data comprises encoding the binary data as a plurality of barcode symbols, and wherein writing the barcode symbol comprises writing a plurality of barcode symbols onto the analog archival medium and linking the plurality of barcode symbols in sequence.

18. A method of preserving a plurality of files that are each comprised of binary data, the method comprising:
providing an analog archival medium;
encoding the binary data that comprises each file in accordance with a predefined encoding specification;
writing the encoded binary data for the plurality of files onto the analog archival medium;
writing information onto the analog archival medium that at least partially defines a relationship of one of the files for which encoded binary data was written onto the analog archival medium to at least one other file for which encoded binary data was also written onto the analog archival medium; and
writing information relating to the predefined encoding specification onto the analog archival medium, wherein the information relating to the predefined encoding specification comprises unencoded information relating to the predefined encoding specification.

19. A method according to claim 18 wherein writing information that at least partially defines a relationship of the respective file to at least one other file comprises writing information that defines directory location relationships between at least some of the plurality of files.

20. A method according to claim 19 wherein writing directory location information that allows uniquely encoding multiple identically named files.

21. A method according to claim 18 wherein encoding the binary data comprises encoding the binary data as a barcode symbol, and wherein writing encoded binary data onto the analog archival medium comprises writing the barcode symbol representing the encoded binary data onto the analog archival medium.

22. A method according to claim 18 wherein providing an analog archival medium comprises providing an analog archival medium selected from the group consisting of microfilm and acid free paper for preserving the binary data.

23. A method of recovering binary data stored on an analog archival medium, the method comprising:
   accessing the analog archival medium;
   reading encoded data as well as information relating to a predefined encoding specification from the analog archival medium; and
   decoding the encoded data in accordance with the predefined encoding specification to recover the binary data,
   wherein reading information relating to the predefined encoding specification from the analog archival medium comprises reading unencoded information relating to the predefined encoding specification from the analog archival medium.

24. A method according to claim 23 wherein reading information relating to the predefined encoding specification from the analog archival medium comprises reading text relating to the predefined encoding specification from the analog archival medium.

25. A method according to claim 23 wherein reading encoded data comprises reading a barcode symbol from the analog archival medium, and wherein decoding the encoded data comprises decoding the barcode symbol to recover the binary data.

26. A method according to claim 23 wherein accessing the analog archival medium comprises accessing the analog archival medium selected from the group consisting of microfilm and acid free paper to recover the binary data.

27. A method according to claim 23 wherein reading the encoded data comprises reading a plurality of blocks of encoded data and linking the blocks of encoded data in sequence.

28. A method of recovering binary data stored on an analog archival medium, the method comprising:
   accessing the analog archival medium;
   reading encoded data as well as a representation of the error detection code from the analog archival medium;
   reading information relating to a predefined encoding specification from the analog archival medium;
   decoding the encoded data in accordance with the predefined encoding specification to recover the binary data; and
   determining accuracy of the recovered binary data based upon the error detection codes,
   wherein reading information relating to the predefined encoding specification from the analog archival medium comprises reading unencoded information relating to the predefined encoding specification from the analog archival medium.

29. A method according to claim 28 wherein the binary data is representative of a file comprised of a plurality of blocks of data that are separately encoded, and wherein determining the accuracy of the recovered binary data comprises determining the error detection code for each block of data and comparing the error detection code determined for each block of data with a corresponding error detection code read from the analog archival medium.

30. A method according to claim 28 wherein the binary data is representative of a file comprised of a plurality of blocks of data that are separately encoded, and wherein determining the accuracy of the recovered binary data comprises determining the error detection code for the file and comparing the error detection code for the file with the error detection code read from the analog archival medium.

31. A method according to claim 28 wherein determining the accuracy of the recovered binary data comprises performing a cyclic redundancy check.

32. A method according to claim 28 wherein reading encoded data comprises reading a barcode symbol from the analog archival medium, and wherein decoding the encoded data comprises decoding the barcode symbol to recover the binary data.

33. A method according to claim 28 wherein accessing the analog archival medium comprises accessing the analog archival medium selected from the group consisting of microfilm and acid free paper to recover the binary data.

34. A method according to claim 28 wherein reading the encoded data comprises reading a plurality of blocks of encoded data and linking the blocks of encoded data in sequence.

35. A method of recovering binary data representative of a file from an analog archival medium, the method comprising:
   accessing the analog archival medium;
   reading a barcode symbol from the analog archival medium;
   reading information relating to a predefined encoding specification from the analog archival medium;
   decoding the barcode symbol in accordance with the predefined encoding specification to recover the binary data; and
   reconstructing the file based at least partially upon the recovered binary data,
   wherein reading information relating to the predefined encoding specification from the analog archival medium comprises reading unencoded information relating to the predefined encoding specification from the analog archival medium.

36. A method according to claim 35 wherein reading the barcode symbol comprises reading a multi-dimensional barcode symbol, and wherein decoding the barcode symbol comprises decoding the multi-dimensional barcode symbol to recover the binary data.

37. A method according to claim 35 wherein accessing an analog archival medium comprises accessing an analog archival medium selected from the group consisting of microfilm and acid free paper to recover the binary data.

38. A method according to claim 35 wherein reading the barcode symbol comprises reading a plurality of barcode symbols and linking the barcode symbols in sequence.

39. An apparatus for preserving binary data on an analog archival medium, the apparatus comprising:
   a processor capable of encoding the binary data in accordance with a predefined encoding specification; and
   a writer capable of writing the encoded binary data onto the analog archival medium, said writer also capable of writing information relating to the predefined encoding specification onto the analog archival medium to facilitate subsequent recovery of the binary data,
   wherein said writer is capable of writing unencoded information relating to the predefined encoding specification onto the analog archival medium.

40. An apparatus according to claim 39 wherein said writer is capable of writing at least one of text and images relating to the predefined encoding specification onto the analog archival medium.

41. An apparatus according to claim 39 wherein said processor is capable of encoding the binary data as a barcode symbol, and wherein said writer is capable of writing the barcode symbol representing the encoded binary data onto the analog archival medium.

42. An apparatus according to claim 39 wherein said writer is capable of writing the encoded binary data onto at least one analog archive medium selected from the group consisting of microfilm and acid free paper.

43. An apparatus for preserving binary data on an analog archival medium, the apparatus comprising:
    a processor capable of determining an error detection code associated with the binary data, said processor also capable of encoding the binary data in accordance with a predefined encoding specification; and
    a writer capable of writing the encoded binary data and a representation of the error detection code onto the analog archival medium, said writer also configured to write information relating to the predefined encoding specification onto the analog archival medium to facilitate subsequent recovery of the binary data,
    wherein said writer is capable of writing information relating to the predefined encoding specification onto the analog archival medium, the information relating to the predefined encoding specification comprising unencoded information relating to the predefined encoding specification.

44. An apparatus according to claim 43 wherein the binary data is representative of a file comprised of a plurality of blocks of data that are separately encoded, and wherein said processor is capable of determining the error detection code for the entire file.

45. An apparatus according to claim 43 wherein the binary data is representative of a file comprised of a plurality of blocks of data that are separately encoded, and wherein said processor is capable of separately determining the error detection code for each block.

46. An apparatus according to claim 43 wherein said processor is capable of performing a cyclic redundancy check.

47. An apparatus according to claim 43 wherein said processor is capable of encoding the binary data as a barcode symbol, and wherein said writer is capable of writing the barcode symbol representing the encoded binary data onto the analog archival medium.

48. An apparatus according to claim 43 wherein said writer is capable of writing the encoded binary data onto an analog archival medium selected from the group consisting of microfilm and acid free paper.

49. An apparatus for preserving binary data representative of a file on an analog archival medium, the apparatus comprising:
    a processor capable of encoding the binary data that is representative of a file as a barcode symbol in accordance with a predefined encoding specification; and
    a writer capable of writing the barcode symbol representing the encoded binary data onto the analog archival medium selected from the group consisting of microfilm, acid-free paper, photo-etched media and laser engraved media,
    wherein said writer is capable of writing unencoded information relating to the predefined encoding specification onto the analog archival medium.

50. An apparatus according to claim 49 wherein said processor is capable of encoding the binary data as a multi-dimensional barcode symbol.

51. An apparatus according to claim 49 wherein said processor is capable of encoding the binary data so as to uniquely represent at least the 256 different characters associated with a single byte.

52. An apparatus according to claim 49 wherein said writer is capable of creating an image of the barcode symbol on the analog archival medium.

53. An apparatus for recovering binary data stored on an analog archival medium, the apparatus comprising:
    a reader capable of processing the analog archival medium, wherein said reader is further capable of reading encoded data as well as information relating to a predefined encoding specification from the analog archival medium; and
    a processor capable of decoding the encoded data in accordance with the predefined encoding specification to recover the binary data,
    wherein said reader is capable of reading unencoded information relating to the predefined encoding specification from the analog archival medium.

54. An apparatus according to claim 53 wherein said reader is capable of reading at least one of text and images relating to the predefined encoding specification from the analog archival medium.

55. An apparatus according to claim 53 wherein said reader is capable of reading a barcode symbol from the analog archival medium, and wherein said processor is capable of decoding the barcode symbol to recover the binary data.

56. An apparatus according to claim 53 wherein said reader is capable of processing an analog archival medium selected from the group consisting of microfilm and acid free paper.

57. An apparatus for recovering binary data stored on an analog archival medium, the apparatus comprising:
    a reader capable of processing the analog archival medium, wherein the reader is further capable of reading encoded data as well as a representation of the error detection code from the analog archival medium, and wherein the reader is also configured to read information relating to a predefined encoding specification from the analog archival medium; and
    a processor capable of decoding the encoded data in accordance with the predefined encoding specification to recover the binary data, wherein said processor is further capable of determining accuracy of the recovered binary data based upon the error detection code,
    wherein said reader is capable of reading unencoded information relating to the predefined encoding specification from the analog archival medium.

58. An apparatus according to claim 57 wherein the binary data is representative of a file comprised of a plurality of blocks of data that are separately encoded, and wherein said processor is capable of determining the error detection code for each block of data and comparing the error detection code determined for each block of data with a corresponding error detection code read from the analog archival medium.

59. An apparatus according to claim 57 wherein the binary data is representative of a file comprised of a plurality of blocks of data that are separately encoded, and wherein said processor is capable of determining the error detection code for the file and comparing the error detection code for the file with the error detection code read from the analog archival medium.

60. An apparatus according to claim 57 wherein said processor is capable of determining the accuracy of the recovered binary data by performing a cyclic redundancy check.

61. An apparatus according to claim 57 wherein said reader is capable of reading a barcode symbol from the analog archival medium, and wherein said processor is capable of decoding the barcode symbol to recover the binary data.

62. An apparatus according to claim 57 wherein said reader is capable of processing an analog archival medium selected from the group consisting of microfilm and acid free paper.

63. An apparatus for recovering binary data representative of a file from an analog archival medium, the apparatus comprising:

a reader capable of processing the analog archival medium, wherein the reader is further capable of reading a barcode symbol from the analog archival medium, and wherein the reader is also configured to read information relating to a predefined encoding specification from the analog archival medium; and a processor capable of decoding the barcode symbol in accordance with the predefined encoding specification to recover the binary data, wherein said processor is further capable of reconstructing the file based at least partially upon the recovered binary data, wherein said reader is capable of reading unencoded information relating to the predefined encoding specification from the analog archival medium.

64. An apparatus according to claim 63 wherein said reader is capable of reading a multi-dimensional barcode symbol, and wherein said processor is capable of decoding the multi-dimensional barcode symbol to recover the binary data.

65. An apparatus according to claim 63 wherein said reader is capable of processing an analog archival medium selected from the group consisting of microfilm and acid free paper.

* * * * *